US009725356B2

(12) United States Patent
Maikowski et al.

(10) Patent No.: US 9,725,356 B2
(45) Date of Patent: Aug. 8, 2017

(54) HEATABLE LENS FOR LUMINAIRES, AND/OR METHODS OF MAKING THE SAME

(71) Applicant: Guardian Industries Corp., Auburn Hills, MI (US)

(72) Inventors: David P. Maikowski, Plymouth, MI (US); David D. McLean, Royal Oak, MI (US); Timothy Bourque, Garden City, MI (US); Christopher Hobbs, Evanston, IL (US)

(73) Assignee: Guardian Industries Corp., Auburn Hills, MI (US)

( * ) Notice: Subject to any disclaimer, the term of this patent is extended or adjusted under 35 U.S.C. 154(b) by 242 days.

(21) Appl. No.: 14/592,356

(22) Filed: Jan. 8, 2015

(65) Prior Publication Data

US 2015/0124447 A1 May 7, 2015

Related U.S. Application Data

(63) Continuation of application No. 13/437,384, filed on Apr. 2, 2012, now Pat. No. 8,939,606, which is a
(Continued)

(51) Int. Cl.
*F21S 4/00* (2016.01)
*C03C 17/34* (2006.01)
(Continued)

(52) U.S. Cl.
CPC .... *C03C 17/3435* (2013.01); *B32B 17/10036* (2013.01); *B32B 17/10201* (2013.01);
(Continued)

(58) Field of Classification Search
CPC ........ B32B 17/10036; B32B 17/10201; C03C 17/3435
See application file for complete search history.

(56) References Cited

U.S. PATENT DOCUMENTS 3,432,225 A 3/1969 Rock
3,736,047 A 5/1973 Gelber et al.
(Continued)

FOREIGN PATENT DOCUMENTS

DE 10-329917 2/2005
EP 0 634 376 1/1995
(Continued)

OTHER PUBLICATIONS

Russian Office Action for Russian Application No. 2012141044.
(Continued)

*Primary Examiner* — Evan Dzierzynski
(74) *Attorney, Agent, or Firm* — Nixon & Vanderhye P.C.

(57) ABSTRACT

Certain example embodiments of this invention relate to heatable glass substrates that may be used in connection with lighting applications, and/or methods of making the same. In certain example embodiments, a glass substrate supports an antireflective (AR) coating on a first major surface thereof, and a conductive coating on a second, opposite major surface thereof. Bus bars connect the conductive coating to a power source in certain example embodiments. The substrate may be heat treated (e.g., heat strengthened and/or thermally tempered), with one or both coatings thereon. The heatable glass substrate thus may help provide a chemical and/or environmental barrier for the luminaire or lighting system disposed behind it. In addition, or in the alternative, the heatable glass substrate may help reduce the amount of moisture (e.g., snow, rain, ice, fog, etc.) that otherwise could accumulate on the luminaire or lighting system.

13 Claims, 4 Drawing Sheets

Related U.S. Application Data continuation-in-part of application No. 13/333,183, filed on Dec. 21, 2011, now Pat. No. 8,834,976, which is a continuation-in-part of application No. 12/926,714, filed on Dec. 6, 2010, now Pat. No. 8,524,337, which is a continuation-in-part of application No. 12/923,082, filed on Aug. 31, 2010, now Pat. No. 8,815,059, which is a continuation-in-part of application No. 12/662,894, filed on May 10, 2010, now Pat. No. 8,304,045, which is a continuation-in-part of application No. 12/659,196, filed on Feb. 26, 2010, now Pat. No. 8,293,344.

(51) Int. Cl.
| | | |
|---|---|---|
| *B32B 17/10* | (2006.01) | |
| *H05B 3/84* | (2006.01) | |
| *C03C 17/245* | (2006.01) | |
| *F21V 5/04* | (2006.01) | |
| *F21Y 115/10* | (2016.01) | |
| *F21Y 115/15* | (2016.01) | |

(52) U.S. Cl.
CPC .. *B32B 17/10211* (2013.01); *B32B 17/10541* (2013.01); *B32B 17/10761* (2013.01); *B32B 17/10788* (2013.01); *C03C 17/2456* (2013.01); *C03C 17/3482* (2013.01); *F21V 5/048* (2013.01); *H05B 3/84* (2013.01); *C03C 2217/70* (2013.01); *C03C 2217/948* (2013.01); *C03C 2218/154* (2013.01); *C03C 2218/32* (2013.01); *F21Y 2115/10* (2016.08); *F21Y 2115/15* (2016.08); *H05B 2203/01* (2013.01); *H05B 2203/013* (2013.01)

(56) References Cited

U.S. PATENT DOCUMENTS

| | | | |
|---|---|---|---|
| 3,781,090 A | 12/1973 | Sumita | |
| 4,387,960 A | 6/1983 | Tani | |
| 4,910,088 A | 3/1990 | Baudin et al. | |
| 5,030,594 A | 7/1991 | Heithoff | |
| 5,093,207 A | 3/1992 | Hodes et al. | |
| 5,166,742 A | 11/1992 | Kobayashi et al. | |
| 5,220,445 A | 6/1993 | Takenaka et al. | |
| 5,344,718 A | 9/1994 | Hartig et al. | |
| 5,376,455 A | 12/1994 | Hartig et al. | |
| 5,514,476 A | 5/1996 | Hartig et al. | |
| 5,520,996 A | 5/1996 | Balian et al. | |
| 5,557,462 A | 9/1996 | Hartig et al. | |
| 5,584,902 A | 12/1996 | Hartig et al. | |
| 5,657,607 A | 8/1997 | Collins et al. | |
| 5,664,395 A | 9/1997 | Collins et al. | |
| 5,770,321 A | 6/1998 | Hartig et al. | |
| 5,776,594 A | 7/1998 | Austin | |
| 5,784,853 A | 7/1998 | Hood et al. | |
| 5,800,933 A | 9/1998 | Hartig et al. | |
| 5,902,652 A | 5/1999 | Collins et al. | |
| 6,014,872 A | 1/2000 | Hartig et al. | |
| 6,042,752 A | 3/2000 | Mitsui | |
| 6,052,965 A | 4/2000 | Florentin et al. | |
| 6,059,909 A | 5/2000 | Hartig et al. | |
| 6,074,730 A | 6/2000 | Laird et al. | |
| 6,144,017 A | 11/2000 | Millett et al. | |
| 6,299,703 B1 | 10/2001 | Chen et al. | |
| 6,586,102 B1 | 7/2003 | Stachowiak | |
| 6,589,657 B2 | 7/2003 | Dannenberg | |
| 6,606,833 B2 | 8/2003 | Richardson et al. | |
| 6,632,491 B1 | 10/2003 | Thomsen et al. | |
| 6,635,321 B2 | 10/2003 | Wang et al. | |
| 6,641,689 B1 | 11/2003 | Aggas | |
| 6,686,050 B2 | 2/2004 | Lingle et al. | |
| 6,692,832 B2 | 2/2004 | Murphy | |
| 6,701,749 B2 | 3/2004 | Wang et al. | |
| 6,802,943 B2 | 10/2004 | Stachowiak | |
| 6,818,309 B1 | 11/2004 | Talpaert et al. | |
| 6,830,817 B2 | 12/2004 | Stachowiak | |
| 6,916,408 B2 | 7/2005 | Laird et al. | |
| 6,916,542 B2 * | 7/2005 | Buhay | B32B 17/10036 428/428 |
| 6,924,037 B1 | 8/2005 | Joret et al. | |
| 6,972,136 B2 | 12/2005 | Koenig et al. | |
| 7,166,359 B2 | 1/2007 | Kriltz et al. | |
| 7,189,458 B2 | 3/2007 | Ferreira et al. | |
| 7,198,851 B2 | 4/2007 | Lemmer et al. | |
| 7,311,938 B2 | 12/2007 | Koenig et al. | |
| 7,419,725 B2 | 9/2008 | Neuman et al. | |
| 7,455,910 B2 | 11/2008 | Stachowiak | |
| 7,504,957 B2 | 3/2009 | Veerasamy | |
| 7,518,093 B2 | 4/2009 | Veerasamy et al. | |
| 7,521,096 B2 | 4/2009 | Lemmer et al. | |
| 7,557,053 B2 | 7/2009 | Thomsen et al. | |
| 7,588,823 B2 | 9/2009 | Taylor | |
| 7,648,769 B2 | 1/2010 | Blacker et al. | |
| 7,700,870 B2 | 4/2010 | Thomsen et al. | |
| 7,767,306 B2 | 8/2010 | Veerasamy | |
| 7,771,571 B2 | 8/2010 | Laird et al. | |
| 7,775,103 B2 | 8/2010 | Veerasamy | |
| 7,830,267 B2 | 11/2010 | Veerasamy | |
| 7,858,191 B2 | 12/2010 | Lemmer et al. | |
| 7,893,350 B2 | 2/2011 | Thomsen et al. | |
| 7,964,284 B2 | 6/2011 | Blacker et al. | |
| 7,964,821 B2 | 6/2011 | Veerasamy et al. | |
| 8,009,053 B2 | 8/2011 | Veerasamy | |
| 8,017,243 B2 | 9/2011 | Blacker et al. | |
| 8,025,941 B2 | 9/2011 | Taylor et al. | |
| 8,109,141 B2 | 2/2012 | Veerasamy | |
| 8,136,967 B2 | 3/2012 | Weaver et al. | |
| 8,293,344 B2 | 10/2012 | Lemmer et al. | |
| 8,304,045 B2 | 11/2012 | Lemmer et al. | |
| 8,524,337 B2 | 9/2013 | Lemmer et al. | |
| 8,815,059 B2 | 8/2014 | McLean et al. | |
| 8,834,976 B2 | 9/2014 | Lemmer et al. | |
| 8,939,606 B2 | 1/2015 | Maikowski et al. | |
| 9,199,875 B2 | 12/2015 | Lemmer et al. | |
| 9,266,773 B2 | 2/2016 | Lemmer et al. | |
| 9,353,000 B2 | 5/2016 | Lemmer et al. | |
| 9,469,767 B2 | 10/2016 | Lemmer et al. | |
| 2001/0041252 A1 | 11/2001 | Laird | |
| 2002/0031674 A1 | 3/2002 | Laird | |
| 2002/0172301 A1 | 11/2002 | Popplewell et al. | |
| 2003/0228484 A1 * | 12/2003 | Finley | B32B 17/00 428/577 |
| 2006/0087739 A1 | 4/2006 | Ockenfuss et al. | |
| 2006/0099428 A1 | 5/2006 | Butz et al. | |
| 2006/0169316 A1 | 8/2006 | Thomsen et al. | |
| 2006/0210783 A1 | 9/2006 | Seder et al. | |
| 2006/0249199 A1 | 11/2006 | Thomsen et al. | |
| 2007/0020465 A1 | 1/2007 | Thiel et al. | |
| 2007/0030569 A1 | 2/2007 | Lu et al. | |
| 2007/0036986 A1 | 2/2007 | Chonlamaitri et al. | |
| 2007/0036990 A1 | 2/2007 | Dietrich et al. | |
| 2007/0074757 A1 | 4/2007 | Mellott et al. | |
| 2007/0116966 A1 | 5/2007 | Mellott et al. | |
| 2007/0128449 A1 | 6/2007 | Taylor et al. | |
| 2007/0128451 A1 | 6/2007 | Ferreira et al. | |
| 2007/0215205 A1 | 9/2007 | Thomsen et al. | |
| 2007/0218264 A1 | 9/2007 | Gueneau et al. | |
| 2008/0008829 A1 | 1/2008 | Blacker et al. | |
| 2008/0185041 A1 | 8/2008 | Sharma et al. | |
| 2009/0010203 A1 | 1/2009 | Pratt, Jr. et al. | |
| 2009/0025776 A1 | 1/2009 | Varaprasad | |
| 2009/0025777 A1 | 1/2009 | Varaprasad | |
| 2009/0032098 A1 | 2/2009 | Lu | |
| 2009/0075092 A1 | 3/2009 | Varaprasad | |
| 2009/0101209 A1 | 4/2009 | Sharma et al. | |
| 2009/0133748 A1 | 5/2009 | Sharma | |
| 2009/0148709 A1 | 6/2009 | Distelforf et al. | |
| 2009/0153026 A1 | 6/2009 | Tchakarov et al. | |
| 2009/0176107 A1 | 7/2009 | Sharma | |
| 2009/0181256 A1 | 7/2009 | Sharma | |
| 2009/0205956 A1 | 8/2009 | Lu et al. | |
| 2009/0217978 A1 | 9/2009 | Thomsen et al. | |

(56) References Cited

U.S. PATENT DOCUMENTS

| | | |
|---|---|---|
| 2009/0223252 A1 | 9/2009 | Fulton et al. |
| 2009/0324967 A1 | 12/2009 | Disteldorf et al. |
| 2010/0071810 A1 | 3/2010 | Nadaud et al. |
| 2010/0075155 A1 | 3/2010 | Veerasamy |
| 2010/0122728 A1 | 5/2010 | Fulton et al. |
| 2010/0255980 A1 | 10/2010 | Fulton et al. |
| 2010/0279144 A1 | 11/2010 | Frank et al. |
| 2010/0295330 A1 | 11/2010 | Ferreira et al. |
| 2010/0304523 A1 | 12/2010 | Broadway et al. |
| 2010/0311103 A1 | 12/2010 | Boukherroub et al. |
| 2011/0097590 A1 | 4/2011 | Lemmer et al. |
| 2011/0108101 A1 | 5/2011 | Sharma et al. |
| 2011/0117371 A1 | 5/2011 | Nunez-Regueiro et al. |
| 2011/0157703 A1 | 6/2011 | Broadway et al. |
| 2011/0210656 A1 | 9/2011 | Lemmer et al. |
| 2011/0212279 A1 | 9/2011 | Lemmer et al. |
| 2011/0212311 A1 | 9/2011 | Lemmer et al. |
| 2011/0262726 A1 | 10/2011 | Knoll et al. |
| 2011/0275506 A1 | 11/2011 | Fulton et al. |
| 2012/0021149 A1 | 1/2012 | Myli et al. |
| 2012/0048722 A1 | 3/2012 | McLean et al. |
| 2012/0057236 A1 | 3/2012 | Broadway et al. |

FOREIGN PATENT DOCUMENTS

| | | |
|---|---|---|
| EP | 0 646 660 | 4/1995 |
| EP | 0 676 379 | 10/1995 |
| EP | 0 719 876 | 7/1996 |
| EP | 1 809 074 | 7/2007 |
| GB | 2 031 756 | 4/1980 |
| JP | 07-114841 | 5/1995 |
| RU | 2 127 231 | 4/1994 |
| WO | WO 94/25410 | 11/1994 |
| WO | WO 95/13189 | 5/1995 |
| WO | WO 01/55752 | 8/2001 |

OTHER PUBLICATIONS

U.S. Appl. No. 13/437,384, filed Apr. 2, 2012; Maikowski et al.
U.S. Appl. No. 13/333,183, filed Dec. 21, 2011; Lemmer et al.
U.S. Appl. No. 13/064,066, filed Mar. 3, 2011; Frank et al.
U.S. Appl. No. 13/183,833, filed Jul. 15, 2011; Benito et al.
U.S. Appl. No. 13/317,176, filed Oct. 12, 2011; O'Connor et al.
U.S. Appl. No. 13/324,267, filed Dec. 13, 2011; Frank et al.
U.S. Appl. No. 13/333,069, filed Dec. 21, 2011; Lage et al.
U.S. Appl. No. 12/929,481, filed Jan. 27, 2011; Broadway et al.
"Homogeneously Aligned Liquid Crystal Display on Silicon Oxynitride Thin Film Using Ion Beam Bombardment"; Oh et al., Materials Chemistry and Physics 117 (2009) pp. 355-358.
"A Full Description of a Simple and Scalable Fabrication Process for Electrowetting Displays", Zhou et al., Journal of Micromechanics and Microengineering 19, (2009) pp. 1-12.

\* cited by examiner

HEATABLE LENS FOR LUMINAIRES, AND/OR METHODS OF MAKING THE SAME

This application is a continuation of application Ser. No. 13/437,384, filed Apr. 2, 2012, which is a Continuation-in-Part (CIP) of U.S. patent application Ser. No. 13/333,183, filed Dec. 21, 2011 (now U.S. Pat. No. 8,834,976), which is a CIP of U.S. patent application Ser. No. 12/926,714, filed Dec. 6, 2010 (now U.S. Pat. No. 8,524,337), which is a CIP of U.S. patent application Ser. No. 12/923,082, filed Aug. 31, 2010 (now U.S. Pat. No. 8,815,059), and Ser. No. 12/662,894, filed May 10, 2010 (now U.S. Pat. No. 8,304,045) the latter of which is a CIP of U.S. patent application Ser. No. 12/659,196, filed Feb. 26, 2010 (now U.S. Pat. No. 8,293,344), the disclosures of each of which are hereby incorporated herein by reference. Priority is claimed on each of these prior applications.

FIELD OF THE INVENTION

Certain example embodiments of this invention relate to heatable lenses for luminaires, and/or methods of making the same. More particularly, certain example embodiments of this invention relate to glass substrates that support antireflective and conductive coatings on opposing major surfaces thereof that help serve as chemical and environmental barriers to underlying luminaires and help remove moisture-related disturbances from surfaces thereof and reduce transmission losses related to reflection, and/or methods of making the same.

BACKGROUND AND SUMMARY OF EXAMPLE EMBODIMENTS OF THE INVENTION

Moisture is known to condense on skylights, refrigerator/freezer doors, vehicle windows, lighting systems, and other glass-inclusive products. Condensation buildup on skylights detracts from the aesthetic appeal of the lite. Similarly, condensation buildup on refrigerator/freezer doors in supermarkets or the like sometimes makes it difficult for shoppers to quickly and easily pinpoint the products that they are looking for. Condensation buildup on automobiles often is an annoyance in the morning, as a driver oftentimes must scrape frost or ice and/or actuate the vehicle's defroster and/or windshield wipers to make it safer to drive. Moisture and fog on the windshield oftentimes presents a similar annoyance, although they may also pose potentially more significant safety hazards as a driver traverses hilly areas, as sudden temperature drops occur, etc.

Condensation buildup on lighting systems (e.g., billboards, etc.) also can occur. In fact, given the widespread adoption of Solid-State Lighting (SSL) solutions and the fact that their light sources (e.g., LEDs) typically do not generate infrared (IR) heat (unlike some High-Intensity Discharge (HID), Incandescent, and Halogen light source technologies) when generating light, the condensation problem can be more severe, e.g., because of visibility and safety concerns. It is believed that no SSL-based solution has been able to be used successfully on a commercial scale in applications where the lighting fixture is directly exposed and susceptible (close to ground level) to ice and snow build-up, and/or where full light output is critical for safety (e.g., airport runways, walkways, stairs, etc.), for example.

Thus, it will be appreciated there is a need in the art for improved lighting systems (e.g., SSL lighting systems) that do not suffer from these and/or other condensation issues.

One aspect of certain example embodiments of this invention relates to a heatable glass lens solution that provides localized heating to remove condensation (e.g., snow, ice, etc.) build-up thereon, that otherwise could reduce the associated lighting system's light output and efficiency.

Another aspect of certain example embodiments of this invention relates to a monolithic tempered coated glass solution that allows the glass lens to be rapidly and uniformly heated in a SSL fixture while also achieving high light output efficiency.

Certain example embodiments include a high transmittance conductive coating (e.g., greater than about 87% on clear float glass), that optionally incorporate a visual antireflective (AR) coating on the opposite side of the monolithic glass lens to further enhance light transmission (e.g., for another 4% point visible light transmission gain).

In certain example embodiments of this invention, a lens for a lighting system is provided. A glass substrate supports antireflective and transparent coatings on first and second major surfaces thereof, respectively. At least one bus bar is in electrical communication with the conductive coating, with the at least one bus bar being configured to convey voltage to the conductive coating from an external power source to, in turn, cause the conductive coating to heat up. The antireflective and transparent coatings are sputtered coatings. The substrate is heat treated together with the antireflective and transparent coatings thereon.

According to certain example embodiments, a lighting system may include one or more solid state lights (e.g., LEDs, OLEDs, PLEDs, Plasma Emitting Discharge, etc., in an array or other format). The lenses described herein may, for example, be interposed between the one or more solid state lights and a viewer of the lighting system. A power source operable to drive the conductive coating of the lens at a power density of 1-6 $W/in^2$ is provided.

In certain example embodiments of this invention, a lighting system including one or more solid state lights is provided. A lens is spaced apart from the one or more solid state lights. The lens includes: a first glass substrate supporting a sputter-deposited antireflective coating on a major surface thereof and a second glass substrate supporting a sputter-deposited conductive coating on a major surface thereof. The first and second substrates are laminated to one another such that coated surfaces thereof face away from one another. The first substrate with the antireflective coating thereon and/or the second with the conductive coating thereon is/are heat treated.

In certain example embodiments of this invention, a method of making a heatable lens for a lighting system is provided. A multilayer antireflective coating is sputter deposited on a first major surface of a glass substrate. A multilayer conductive coating is sputter deposited on a second major surface of the glass substrate, with the first and second major surfaces being opposite one another. The glass substrate is heat treated with the multilayer antireflective and conductive coatings thereon. At least one bus bar is disposed on the glass substrate such that the at least one bus bar is in electrical communication with the conductive coating so as to heat the substrate when voltage is provided from an external power source.

According to certain example embodiments, a method of making a lighting system is provided. The methods of making the lenses described herein may be performed. A solid state light source is provided. The lens is provided in spaced apart relation to the light source. The at least one bus bar of the lens is connected to an external power source.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments of this invention relate to heatable glass substrates that may be used in connection with lighting applications, and/or methods of making the same. In certain example embodiments, a glass substrate supports an antireflective (AR) coating on a first major surface thereof, and supports a conductive coating on a second major surface thereof, the first and second major surfaces being opposite one another. Bus bars connect the conductive coating to a power source in certain example embodiments. The substrate may be thermally tempered, e.g., with one or both coatings thereon. In other words, the antireflective coating and/or the conductive coating may survive thermal tempering processes.

Figure 1:
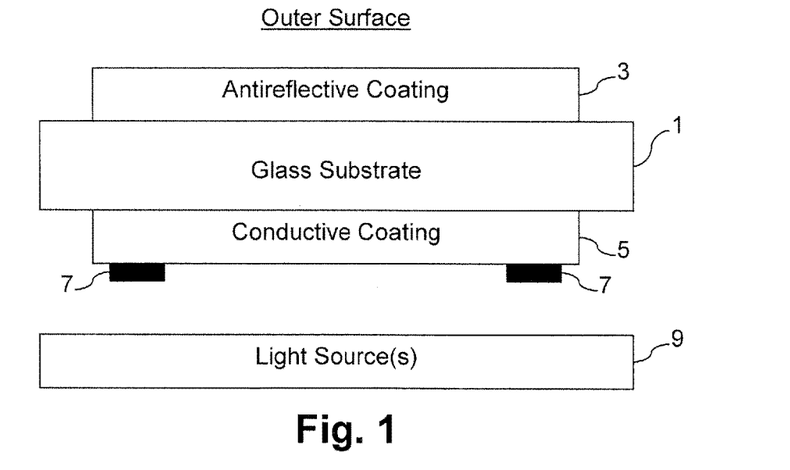
FIG. 1 is a cross-sectional view of an example heatable substrate in accordance with certain example embodiments.

Referring now more particularly to the accompanying drawings in which like reference numerals indicate like parts in the several views, FIG. 1 is a cross-sectional view of an example heatable substrate in accordance with certain example embodiments. As shown in FIG. 1, the substrate 1 supports an antireflective coating 3 on a first major surface thereof, as well as a conductive coating 5 on an opposing major surface thereof. Bus bars in any suitable configuration may be used to help supply power to the conductive coating 5 supported by the substrate 1. The antireflective coating 3 is provided proximate to the outside of the overall lighting assembly, whereas the conductive coating 5 is provided closer to the light source(s) 9. The light source(s) 9 may be any suitable light source(s). For instance, the light source(s) 9 may comprise an array of LED, OLED, PLED, and/or other light sources in different example embodiments.

The bus bars 7 shown in FIG. 1 may provide an interface between the incoming electrical load and the conductive coating 5. In some cases, the bus bars 7 may be of or include Ag. In certain example implementations, the bus bars 7 may be silkscreened on or otherwise disposed in electrical contact with at least a portion of the conductive coating 5 surface. The size, geometry, thickness, and detailed material specifications may be modified based on the requirements or desires for the specific application.

The coated article in FIG. 1 is shown as being spaced apart from the light source(s) 9. In this sense, the coated article essentially is a lens for a luminaire serving, for example, as a chemical and/or environmental barrier therefor (e.g., by reducing the likelihood of condensation, snow, ice, and/or other moisture-related accumulations, as well as serving as a barrier as to dirt, debris, etc.). However, in certain example embodiments, the coated article in FIG. 1 may be laminated to the light source(s) 9. Any suitable laminate may be used. For example, EVA, PVB, and/or any other suitable interlayer may be used in different embodiments of this invention. In such cases, the conductive coating 5 may be supplemented or replaced by making the interlayer heatable. This may be accomplished in certain example instances by, for example, running a tungsten wire or other element through a suitable thermally conductive material.

As alluded to above, the heatable lens may be an "active" coating in the sense that it is actively powered by an external power source. This external power source may, for example, provide constant heating in some implementations. For instance, the glass may be kept at a constant temperature, e.g., by utilizing a controller and a temperature gauge. In other implementations, the external power source may be manually and/or automatically actuatable. For instance, the power source may be connected to one or more sensors and a controller. The controller may cause heating to be initiated when the temperature drops below a certain threshold; when a vision and/or condensation sensor detects rain, snow, ice, fog, etc., on the surface of the lens, etc. Example condensation and/or light sensors are disclosed in, for example, U.S. Pat. Nos. 8,109,141; 8,009,053; 7,830,267; 7,775,103; and 7,504,957, which are hereby incorporated herein by reference in their entireties. According to certain example embodiments, the voltage that is applied may provide substantially uniform heating for a predetermined amount of time, or an amount of time sufficient to remove the snow, ice, rain, etc. In some cases, continuous voltages may be applied. In other cases, pulsed voltages may be applied, e.g., in accordance with the techniques disclosed in U.S. Pat. Nos. 7,964,821 and 7,518,093, which are incorporated herein by reference. It is noted that the low voltages advantageously do not present a sodium migration problem. The presence of a silicon-inclusive base layer in the multilayer conductive thin film also helps block sodium migration.

The AR coating 3 may be any suitable AR coating in different example embodiments of this invention. Suitable AR coatings are described in, for example, U.S. Publication Nos. 2011/0157703 and 2012/0057236, as well as U.S. application Ser. No. 12/929,481, filed on Jan. 27, 2011. The entire contents of each of these documents is hereby incorporated herein by reference. It is noted that these AR coatings are desirable because they are heat treatable. That is, in certain example embodiments, these AR coatings may substantially maintain their aesthetic qualities and high chemical and mechanical durability, even after exposure to temperatures typically encountered in thermal tempering and/or heat strengthening. These layers may be deposited via sputtering (e.g., Magnetron Sputtering Vacuum Deposition) or the like.

The AR coating 3 includes, in order moving away from the substrate, medium, high, and low index layers, and increases light transmission (e.g., reduces reflection) at least in the visible range of 390-750 nm wavelengths. These layers may directly contact one another in certain example instances. In addition, in some cases, the AR coating 3 may be a dielectric type coating in that each of layers is a dielectric layer (i.e., not electrically conductive). In certain example embodiments, the low index layer may be of or include silicon or an oxide thereof (e.g., $SiO_2$ or other suitable stoichiometry), MgF, or their alloyed oxide and fluoride. In certain example embodiments, the high index layer may be of or include a metal oxide, metal nitride and/or metal oxynitride such as titanium oxide (e.g., $TiO_2$ or other suitable stoichiometry), zinc oxide, silicon or a nitride thereof, or the like. The AR coating component of the substrate thus may help increase light transmission and efficiency of the luminaire or lighting system, e.g., by reducing second surface reflection losses.

Figure 2:
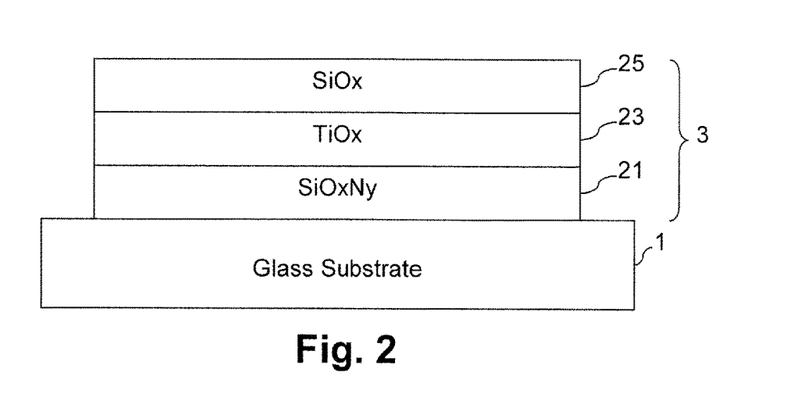
FIG. 2 is an example antireflective coating that may be used in connection with certain example embodiments.

FIG. 2 is a cross-sectional view of an example AR coating in accordance with certain example embodiments. In the FIG. 2 example, the medium index layer 21 is a bottom layer of the AR coating and has an index of refraction (n) of from about 1.60 to 2.0, more preferably from about 1.65 to 1.9, even more preferably from about 1.7 to 1.8, and most preferably from about 1.7 to 1.79 (at 550 nm). At 380 nm, in certain example embodiments, an ideal refractive index of medium index layer 21 is from about 1.8 to 2.0. In further example embodiments, the index of refraction of medium index layer 21 is from about 1.65-1.8 at 780 nm.

In certain instances, it is advantageous that the material(s) comprising medium index layer 21 have desired optical and mechanical properties in the as-deposited state as well as after exposure to temperatures typical in tempering and/or heat treating environments. It will be appreciated that materials such as aluminum oxynitride, though having desired properties in the as-deposited state, may degrade in optical and/or mechanical properties after exposure to temperatures typical in tempering and/or heat treating environments. Aluminum oxynitride may, however, be used in different embodiments of this invention if it can be made to be sufficiently survivable.

Furthermore, it is advantageous if the medium index layer 21 has a compressive residual stress in both the as-coated and heat-treated states. In certain example embodiments, this compressive residual stress may help to offset the tensile residual stress in the other layer(s) in the stack. In certain instances, this may promote a net compressive stress in the three layer AR stack, which discourages cracking of the coating during the tempering and/or heat treating processes.

Medium index layer 21 preferably has a thickness of from about 75 to 135 nm, more preferably from about 80 to 130 nm, even more preferably from about 89 to 120 nm, and most preferably from about 94 to 115 nm.

It has surprisingly been found that silicon oxynitride (e.g., SiOxNy) can be deposited to have an index of refraction of from about 1.60 to 2.0, more preferably from about 1.65 to 1.9, even more preferably from about 1.7 to 1.85 or 1.7 to 1.8, and most preferably from about 1.7 to 1.79 (at 550 nm), and will not significantly degrade in its mechanical or optical properties upon tempering and/or heat treatment. Moreover, in certain example embodiments, a layer of or comprising silicon oxynitride (e.g., SiOxNy) advantageously has a compressive residual stress in both the as-coated and heat-treated states. Still further, in certain example embodiments, a layer of or comprising silicon oxynitride (e.g., SiOxNy) may produce the following advantages: 1) Small color shift (e.g., $\Delta E^* < 3$ units), after baking in an air environment at times and temperatures ranges typical for glass tempering processes; 2) Little to no appreciable degradation in the desired optical characteristics of the coating after tempering in the visible region of the spectrum; and 3) Little to no appreciable change in the refractive index in the visible portion of the spectrum after exposure to typically tempering environments. Therefore, it has advantageously been found that a layer of or including silicon oxynitride (e.g., SiOxNy) is suitable for use as a medium index layer 21 in a temperable three layer AR coating.

In certain example embodiments of this invention, the high index layer 23 is provided over the medium index layer 21 of the AR coating 3. High index layer 23 has an index of refraction of at least about 2.0, preferably from about 2.1 to 2.7, more preferably from about 2.25 to 2.55, and most preferably from about 2.3 to 2.5 (at 550 nm) in certain example embodiments. In certain example embodiments, an ideal index of refraction of high index layer 23 at 380 nm may be from about 2.7 to 2.9 (and all subranges therebetween). In further example embodiments, an ideal index of refraction of high index layer 23 at 780 nm may be from about 2.2 to 2.4 (and all subranges therebetween).

High index layer 23 preferably has a thickness of from about 5 to 50 nm, more preferably from about 10 to 35 nm, even more preferably from about 12 to 22 nm, and most preferably from about 15 to 22 nm. In certain exemplary embodiments, the high index layer 23 has a thickness of less than about 25 nm.

In certain instances, it is advantageous that the material(s) comprising high index layer 23 have a high index of refraction. An example material for use as a high index layer is titanium oxide (e.g., TiOx). However, in certain example embodiments, titanium oxide has a high tensile residual stress after exposure to temperatures above 300 degrees C. The high tensile stress in this layer is associated with a phase change from amorphous to crystalline, observed between the as-coated and as-heat treated states. This phase change, in certain instances, occurs at a temperature below the maximum temperature of exposure of the coating during a typical tempering and/or heat treating process. The greater the thickness of the titanium oxide-based layer, the greater the tensile residual stress. Depending on the thickness of the titanium oxide-based layer (e.g., TiOx), the high tensile residual stress in the titanium oxide-based layer can case an overall large net tensile stress in the three layer stack. The titanium oxide may be stoichiometric $TiO_2$ or partially oxygen deficient/sub-stroichiometric TiOx in different embodiments of this invention. Of course, other materials (including those of or including TiOx) may be used in different embodiments of this invention.

Therefore, it will be advantageous in certain instances if a temperable AR coating including a high index layer of or including titanium oxide (e.g., TiOx) comprises other layers (e.g., medium index layer and/or low index layer) having and/or promoting net compressive residual stress after tempering and/or heat treating, in order to offset the high tensile stress of titanium oxide based layer after exposure to high temperatures. In other instances, it is further advantageous if the physical thickness of the high index titanium oxide-based layer 23 (e.g., of or including TiOx) can be reduced, while still maintaining the appropriate range of optical thicknesses to achieved desired optical properties of the temperable AR coating. In certain example embodiments, this will advantageously reduce the net tensile stress of the layer, and may promote a net compressive residual stress for the overall coating. In other words, in certain example embodiments, when the physical thickness of the titanium oxide-based layer is limited, and the other layers are of materials having compressive residual stresses after tempering and/or heat treatment, it has surprisingly been found that a chemically and mechanically durable tempered coated article with good antireflective properties can be achieved.

In certain example embodiments of this invention, the low index layer 25 is provided over the high index layer 23 of the AR coating 3. Layer 25 has an index of refraction of from about 1.4 to 1.6, more preferably from about 1.45 to 1.55, and most preferably from about 1.48 to 1.52 (at 550 nm) in certain example embodiments. In certain example embodiments, an ideal index of refraction of low index layer 25 at 380 nm may be from about 1.48 to 1.52 (and all subranges therebetween). In further example embodiments, an ideal index of refraction of low index layer 25 at 780 nm may be from about 1.46 to 1.5 (and all subranges therebetween).

In certain example embodiments, low index layer 25 has a thickness of from about 70 to 130 nm, more preferably from about 80 to 120 nm, even more preferably from about 89 to 109 nm, and most preferably from about 100 to 110 nm.

In certain instances, it is advantageous that the material(s) comprising low index layer 25 have an index of refraction lower than both the medium and high index layers, and in certain example embodiments, the refractive index of low index layer 25 may be less than that of the glass substrate upon which the coating is provided. An example material for use as or in a low index layer is silicon oxide (e.g., SiOx).

The use of silicon oxide (e.g., SiOx) as or in the low index layer in a temperable three layer AR coating in certain example embodiments is advantageous because silicon oxide has a low refractive index, and high chemical and mechanical durability. Additionally, in certain example embodiments, a low index layer based on silicon oxide advantageously has a compressive residual stress in both the as-coated and heat-treated/tempered states. In certain example embodiments, the compressive residual stress in a low index layer based on silicon oxide may help to offset the tensile residual stress in the titanium oxide-based layer. Utilizing a low index layer with compressive residual stress in conjunction with a high index layer with high tensile residual stress helps to promote a net compressive stress in a temperable three layer AR stack in certain example embodiments. This is advantageous in that it may help discourage cracking of the AR coating 3 during tempering and/or heat treating the coated article in certain example embodiments.

Example ranges for the thicknesses of each layer are as follows:

TABLE 1

Example Materials/Thicknesses (FIG. 2 Embodiment)

| Layer Glass | Range (nm) | More Preferred (nm) | Example (nm) |
|---|---|---|---|
| $SiO_xN_y$ (21) | 75-135 nm | 94-115 nm | 95 nm |
| $TiO_x$ (23) | 10-35 nm | 12-22 nm | 21 nm |
| $SiO_x$ (25) | 70-130 nm | 89-109 nm | 105 nm |

The following tables show the as coated to heat treated (HT) color shifts for the single sided AR coatings on low-iron glass. It will be appreciated that the heat treatment processes have a reduced (and sometimes no) appreciable impact on the aesthetic (e.g., reflected color) quality of the coating. The example coatings described herein have purple hues as deposited, for example. The example purple hue is maintained after heat treatment. This is particularly desirable in a number of applications, where aesthetic quality in terms of reflected color is correspondingly desired.

TABLE 2

Example AR Average Color Readings

| | L* | a* | b* | Y |
|---|---|---|---|---|
| HT Trans | 97.92 | −0.92 | 0.77 | 94.72 |
| HT Glass | 25.96 | 3.99 | −3.93 | 4.73 |
| HT Film | 25.80 | 3.94 | −3.95 | 4.68 |
| Trans | 97.56 | −0.83 | 1.19 | 93.82 |
| Glass | 26.34 | 2.75 | −3.46 | 4.86 |
| Film | 26.02 | 2.75 | −3.30 | 4.75 |

TABLE 3

Example AR Predicted Color Shifts During HT

| | ΔL* | Δa* | Δb* | ΔY | ΔE |
|---|---|---|---|---|---|
| Transmission | 0.37 | −0.09 | −0.43 | 0.91 | 0.57 |
| Glass | −0.38 | 1.24 | −0.47 | −0.13 | 1.38 |
| Film | −0.22 | 1.20 | −0.65 | −0.07 | 1.38 |

Further example ranges for the thicknesses of each layer are as follows:

TABLE 4

Further Example Materials/Thicknesses (FIG. 2 Embodiment)

| Layer Glass | Range (nm) | More Preferred (nm) | Example (nm) |
|---|---|---|---|
| $SiO_xN_y$ (21) | 45-85 nm | 50-70 nm | 60-61 nm |
| $TiO_x$ (23) | 75-125 nm | 85-115 nm | 102 nm |
| $SiO_x$ (25) | 70-130 nm | 80-115 nm | 87-93 nm |

Ten samples with thicknesses of 60 nm, 102 nm, and 93 nm for the medium, high, and low index layers including the above-identified materials were generated. Averaged data from both Illuminate C and D65 observers at 2 and 10 degrees, respectively, are provided in the table below.

TABLE 5

Average Performance Values for Table 3 Sample

| | $R_{vis}$ | $T_{vis}$ | ΔE* | $R_{vis}$ | $T_{vis}$ | ΔE* |
|---|---|---|---|---|---|---|
| As Deposited | 4.93 | 93.3 | 2.78 | 4.95 | 93.3 | 2.48 |
| Tempered | 4.75 | 93.5 | | 4.79 | 93.5 | |
| Illuminant | | C/2° | | | D65/10° | |

As indicated in the table above, a color shift, ΔE*, between as deposited and tempered of less than 3, is achieved. As can be seen in the above table, when using illuminate C at 2° and illuminate D65 at 10° the ΔE* value for the above example 3 layer AR is below the desired ΔE* value of 3. Furthermore, both the $R_{vis}$ and $T_{vis}$ optical properties are substantially the same or similar pre- and post tempering. Such attributes are desirable in producing tempered coated articles.

Changes in optical characteristics (e.g., $ΔR_{vis}$, $ΔT_{vis}$, ΔE*) between the as deposited and tempered states may be further reduced by adjusting the stochiometry of the SiOxNy in certain example instances. Alternatively, or in addition, optical characteristics (e.g., $ΔR_{vis}$, $ΔT_{vis}$, ΔE*) between the as deposited and tempered states may be further reduced by adjusting the physical thickness of all the layers in the stack (e.g., the medium, high, and low) in order to shift the spectral curve while maintaining the desired spectral bandpass.

It will be appreciated that in certain example embodiments, any layer stack arranged to have glass/medium/high/low, glass/high/low, high/low alternating, etc., index layers may be used, provided that it supplies suitable optics, e.g., matched to the desired application. In some cases, a layer comprising NbOx may replace a layer comprising TiOx. In some cases, the bottom layer comprising SiOxNy may be considered a barrier layer and, as such, it may be replaced with materials, provided that such materials do not interfere with the overall optics of the AR layer stack.

Referring once again to FIG. 1, the conductive coating 5 shown therein may in some instances be a durable sputter-deposited heat treatable coating. Suitable conductive coatings are disclosed in, for example, U.S. Publication No. 2011/0212311, as well as U.S. application Ser. No. 13/333,183, filed Dec. 21, 2011. The entire contents of each of these references is hereby incorporated herein by reference. Thus, it will be appreciated that the conductive coating 5 may, for example, include a multilayer thin film stack as shown, for example, in FIG. 3.

Figure 3:
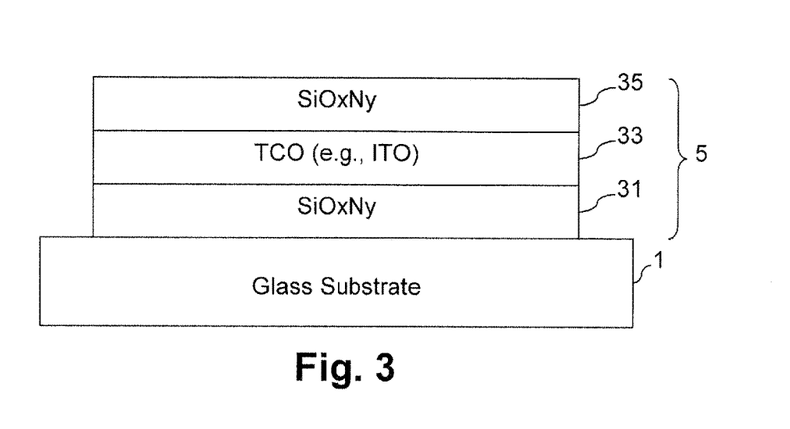
FIG. 3 is an example transparent coating that may be used in connection with certain example embodiments.

As shown in FIG. 3, the conductive coating 5 includes a layer comprising a transparent conductive oxide (TCO) 33, sandwiched between an undercoat layer 31 and an overcoat layer 35. The TCO inclusive layer 33 may have a refractive index of 1.7-2.1 at 550 nm. In some cases, the TCO inclusive layer 33 may have an index of refraction of 1.9, e.g., in cases where it comprises indium tin oxide (ITO). The sheet resistance of the TCO inclusive layer may be between 10-30 ohms/square in certain example embodiments. Its physical thickness preferably is 50-500 nm, more preferably 75-250 nm, and still more preferably 100-170 nm. The undercoat 31 and the overcoat 35 may be of or include an oxide and/or nitride of silicon. For instance, as shown in the FIG. 3 example, the undercoat 31 and the overcoat 35 each comprise SiOxNy. The undercoat 31 and the overcoat 35 may have an index of refraction preferably of 1.45-2.10, and 1.7 as an example, at 550 nm. The optical extinction coefficient may be close to 0 (e.g., <0.01) at 550 nm. The physical thickness of such layers preferably is 5-500 nm, more preferably 25-250 nm, and still more preferably 55-125 nm. It will be appreciated that, in certain example embodiments, the coating layer thickness may be tuned based on the voltage supplied and the size of the substrate to arrive at a desired temperature or temperature range (e.g., 40 degrees C. in 20 degrees C., ambient).

Example thicknesses and indices of refraction for each of the layers is provided in the table that follows:

Other variants of this layer stack are possible in different embodiments of this invention. Such variants may include, for example, using partially or fully oxided and/or nitrided layers for the first and/or second silicon-inclusive layers, adding a protective overcoat comprising ZrOx, adding one or more index matching layers (e.g., comprising TiOx) between the glass substrate and the second silicon-inclusive layer, etc. For instance, certain example embodiments may involve modifying the FIG. 3 example layer stack so as to replace the top layer comprising SiOxNy with SiN, add a layer comprising ZrOx (e.g., to potentially increase durability), both replace the top layer comprising SiOxNy with SiN and add a layer comprising ZrOx, etc. Thus, it will be appreciated that the possible modifications listed herein may be used in any combination or sub-combination. It will be appreciated that the bottom layer comprising SiOxNy need not necessarily be provided in all embodiments. For instance, ITO is a good blocker itself, and thus may not deteriorate (or allow other layers thereon) to suffer from the negative influences of alkali ions migrating out of the glass. Thus, the ITO may be provided directly on the glass substrate in certain example embodiments.

The FIG. 3 example embodiment advantageously is very durable, e.g., after heat treatment, even though it does not include an overcoat layer comprising ZrOx or the like (although a ZrOx inclusive or other overcoat layer(s) may be provided in certain example embodiments, as indicated above). Thus, the FIG. 3 example layer stack is particularly well-suited for use in an assembly similar to that shown in FIG. 1.

As alluded to above, the FIG. 3 example layer stack is heat treatable in certain example embodiments. Such heat treatment may be accomplished using an infrared (IR) heater, a box or other furnace, a laser annealing process, etc. The table that follows includes performance data for the monolithic FIG. 3 layer stack post-belt furnace heat treatment (e.g., at 650 degrees C.).

TABLE 7

Monolithic Annealed (Belt Furnace at 650 degrees C.) Performance Data

| | |
|---|---|
| T | 88.10 |
| ΔE (Annealed to Tempered) | 0.37 |
| a*, Transmission | −0.60 |
| b*, Transmission | 0.54 |

TABLE 6

Example Materials/Thicknesses (FIG. 3 embodiment)

| | Example Thickness Range (nm) | First Example Thickness (nm) | Second Example Thickness (nm) | Example Index of Refraction Range | Preferred Index of Refraction Range | First Example Index of Refraction | Second Example Index of Refraction |
|---|---|---|---|---|---|---|---|
| SiOxNy | 30-100 | 60 | 70 | 1.5-2.1 | 1.7-1.8 | 1.75 | 1.7 |
| ITO | 95-160 | 105 | 105 | 1.7-2.1 | 1.8-1.93 | 1.88 | 1.9 |
| SiOxNy | 30-100 | 65 | 70 | 1.5-2.1 | 1.7-1.8 | 1.75 | 1.7 |
| Glass | N/A | N/A | N/A | N/A | N/A | N/A | N/A |

TABLE 7-continued

Monolithic Annealed (Belt Furnace at 650 degrees C.) Performance Data

| | |
|---|---|
| L*, Transmission | 95.20 |
| Rg | 9.08 |
| ΔE (Annealed to Tempered) | 1.04 |
| a*, Glass Side | −0.26 |
| b*, Glass Side | −2.16 |
| L*, Glass Side | 36.14 |
| Rf | 9.06 |
| ΔE (Annealed to Tempered) | 1.16 |
| a*, Film Side | −0.69 |
| b*, Film Side | −2.28 |
| L*, Film Side | 36.10 |
| Transmitted Color Rendering Index (CRI) | 97.91 |
| T-Haze | 0.12 |
| Surface Roughness | 1.8 |
| Sheet Resistance (NAGY) | 17-19 |
| Hemispherical Emittance | 0.19 or 0.20 |

Although certain conductive coatings have been described above, other variations are possible. For instance, as indicated above, a conductive layer stack of glass/ITO/Si-inclusive layer may be provided. Other overcoats may be provided, e.g., to protect the ITO from over-oxidation during heat treatment. In other cases, silver, aluminum-doped zinc oxide, pyrolytically deposited fluorine-doped tin oxide, and/or other materials may be used, e.g., if they are provided at a suitable thickness. It is noted that although zinc-based transparent conductive oxides (TCOs) typically are not very durable and sometimes are susceptible to moisture attack, they may be used in protected (e.g., laminated applications), e.g., of the types described herein. In other cases, ITO/Ag/ITO, AZO/ITO, and/or other layer stacks may be provided. It will be appreciated that the overcoat may be tuned to help improve visible transmission when other materials (e.g., that do not have as high a visible transmission as ITO or where increased thicknesses are desirable for conductivity purposes) are used. For instance, SnO:F and an overcoat layer comprising SiOx with a refractive index of 1.45-1.52 may help provide visible transmission greater than 87%, especially if an AR coating is provided on an opposite major surface.

A post deposition heat treatment step may be advantageous in helping to re-crystallize the ITO layer and in helping to achieve the desired emissivity and optics (e.g., including those described above). In this regard, the tempered glass assembly (e.g., the substrate 1 including the AR coating 3 and the conductive coating 5) may meet the tempering requirements of ASTM C1048, as well as the impact resistance requirements of ANSI Z97.1. In some cases, the assembly may be designed to support up to a 10 psi internal pressure load. The assembly also preferably is able to withstand temperature conditions of from about −55° C. to +55° C. In a similar vein, the thermal shock requirements of MIL-C-7989, and the glass may reach a maximum operating temperature of 120° C. in some cases. The assembly also may be structured to handle an input power load of up to 100 VAC/DC. Of course, it will be appreciated that these performance metrics are provided by way of example, and certain example embodiments of this invention may be structured to meet some or all of these and/or other tests. The operating power density in certain example may be, for example, 1-6 W/in$^2$.

As alluded to above, the substrates may be glass substrates, e.g., soda lima silica substrates, or low-iron substrates. The thicknesses may be, for example, 1.0-10.0 mm, more preferably 3.0-6.0 mm. Low-iron glass is described in, for example, U.S. Pat. Nos. 7,893,350; 7,700,870; 7,557,053; 6,299,703; and 5,030,594, and U.S. Publication Nos. 2006/0169316; 2006/0249199; 2007/0215205; 2009/0223252; 2010/0122728; 2010/0255980; and 2011/0275506. The entire contents of each of these documents is hereby incorporated herein by reference.

An exemplary soda-lime-silica base glass according to certain embodiments of this invention, on a weight percentage basis, includes the following basic ingredients:

TABLE 8

Example Base Glass

| Ingredient | Wt. % |
|---|---|
| $SiO_2$ | 67-75% |
| $Na_2O$ | 10-20% |
| CaO | 5-15% |
| MgO | 0-7% |
| $Al_2O_3$ | 0-5% |
| $K_2O$ | 0-5% |

Other minor ingredients, including various conventional refining aids, such as $SO_3$, carbon, and the like may also be included in the base glass. In certain embodiments, for example, glass herein may be made from batch raw materials silica sand, soda ash, dolomite, limestone, with the use of sulfate salts such as salt cake ($Na_2SO_4$) and/or Epsom salt ($MgSO_4 \times 7H_2O$) and/or gypsum (e.g., about a 1:1 combination of any) as refining agents. In certain example embodiments, soda-lime-silica based glasses herein include by weight from about 10-15% $Na_2O$ and from about 6-12% CaO. In addition to the base glass (e.g., see Table 8 above), in making glass according to certain example embodiments of the instant invention the glass batch includes materials (including colorants and/or oxidizers) which cause the resulting glass to be fairly neutral in color (slightly yellow in certain example embodiments, indicated by a positive b* value) and/or have a high visible light transmission. These materials may either be present in the raw materials (e.g., small amounts of iron), or may be added to the base glass materials in the batch (e.g., antimony and/or the like). In certain example embodiments of this invention, the resulting glass has visible transmission of at least 75%, more preferably at least 80%, even more preferably of at least 85%, and most preferably of at least about 90% (sometimes at least 91%) (Lt D65).

In certain embodiments of this invention, in addition to the base glass, the glass and/or glass batch comprises or consists essentially of materials as set forth in Table 9 below (in terms of weight percentage of the total glass composition):

TABLE 9

Example Additional Materials in Glass

| Ingredient | General (Wt. %) | More Preferred | Most Preferred |
|---|---|---|---|
| total iron (expressed as $Fe_2O_3$) | 0.001-0.06% | 0.005-0.045% | 0.01-0.03% |
| % FeO | 0-0.0040% | 0-0.0030% | 0.001-0.0025% |
| glass redox (FeO/total iron) | <=0.10 | <=0.06 | <=0.04 |
| cerium oxide | 0-0.07% | 0-0.04% | 0-0.02% |
| antimony oxide | 0.01-1.0% | 0.01-0.5% | 0.1-0.3% |
| $SO_3$ | 0.1-1.0% | 0.2-0.6% | 0.25-0.5% |
| $TiO_2$ | 0-1.0% | 0.005-0.4% | 0.01-0.04% |

In certain example embodiments, the antimony may be added to the glass batch in the form of one or more of $Sb_2O_3$ and/or $NaSbO_3$. Note also $Sb(Sb_2O_5)$. The use of the term antimony oxide herein means antimony in any possible oxidation state, and is not intended to be limiting to any particular stoichiometry.

The low glass redox evidences the highly oxidized nature of the glass. Due to the antimony (Sb), the glass is oxidized to a very low ferrous content (% FeO) by combinational oxidation with antimony in the form of antimony trioxide ($Sb_2O_3$), sodium antimonite ($NaSbO_3$), sodium pyroantimonate ($Sb(Sb_2O_5)$), sodium or potassium nitrate and/or sodium sulfate. In certain example embodiments, the composition of the glass substrate 1 includes at least twice as much antimony oxide as total iron oxide, by weight, more preferably at least about three times as much, and most preferably at least about four times as much antimony oxide as total iron oxide.

In certain example embodiments of this invention, the colorant portion is substantially free of other colorants (other than potentially trace amounts). However, it should be appreciated that amounts of other materials (e.g., refining aids, melting aids, colorants and/or impurities) may be present in the glass in certain other embodiments of this invention without taking away from the purpose(s) and/or goal(s) of the instant invention. For instance, in certain example embodiments of this invention, the glass composition is substantially free of, or free of, one, two, three, four or all of: erbium oxide, nickel oxide, cobalt oxide, neodymium oxide, chromium oxide, and selenium. The phrase "substantially free" means no more than 2 ppm and possibly as low as 0 ppm of the element or material.

The total amount of iron present in the glass batch and in the resulting glass, i.e., in the colorant portion thereof, is expressed herein in terms of $Fe_2O_3$ in accordance with standard practice. This, however, does not imply that all iron is actually in the form of $Fe_2O_3$ (see discussion above in this regard). Likewise, the amount of iron in the ferrous state ($Fe^{2+}$) is reported herein as FeO, even though all ferrous state iron in the glass batch or glass may not be in the form of FeO. As mentioned above, iron in the ferrous state ($Fe^{2+}$; FeO) is a blue-green colorant, while iron in the ferric state ($Fe^{3+}$) is a yellow-green colorant; and the blue-green colorant of ferrous iron is of particular concern, since as a strong colorant it introduces significant color into the glass which can sometimes be undesirable when seeking to achieve a neutral or clear color.

In view of the above, glasses according to certain example embodiments of this invention achieve a neutral or substantially clear color and/or high visible transmission. In certain embodiments, resulting glasses according to certain example embodiments of this invention may be characterized by one or more of the following transmissive optical or color characteristics when measured at a thickness of from about 1 mm-6 mm (most preferably a thickness of about 3-4 mm; this is a non-limiting thickness used for purposes of reference only) (Lta is visible transmission %). It is noted that in the table below the a* and b* color values are determined per Ill. D65, 10 degree Obs.

TABLE 10

Glass Characteristics of Certain Example Embodiments

| Characteristic | General | More Preferred | Most Preferred |
|---|---|---|---|
| Lta (Lt D65): | >=85% | >=90% | >=91% |
| % τe (ISO 9050): | >=85% | >=90% | >=91% |
| % FeO (wt. %): | <=0.004% | =0.003% | <=0.0020% |
| L* (Ill. D65, 10 deg.): | 90-99 | n/a | n/a |
| a* (Ill. D65, 10 deg.): | −1.0 to +1.0 | −0.5 to +0.5 | −0.2 to 0.0 |
| b* (Ill. D65, 10 deg.): | 0 to +1.5 | +0.1 to +1.0 | +0.2 to +0.7 |

In certain example embodiments, post tempering, the conductive coating on a standard 3 mm standard soda lime silica glass substrate together may have a visible transmission of preferably at least 75%, more preferably at least 80%, still more preferably at least 85%, and sometimes even 87% or higher. These values may be boosted by about 4% points when the AR coating is provided, e.g., such that when both are provided on a standard 3 mm standard soda lime silica glass substrate, the assembly may have a visible transmission of preferably at least 79%, more preferably at least 84%, still more preferably at least 89%, and sometimes even 91% or higher. The transmission increase preferably is at least about 3.0% points, more preferably 3.5% points, and sometimes at least about 4% points as indicated above.

Figure 4:
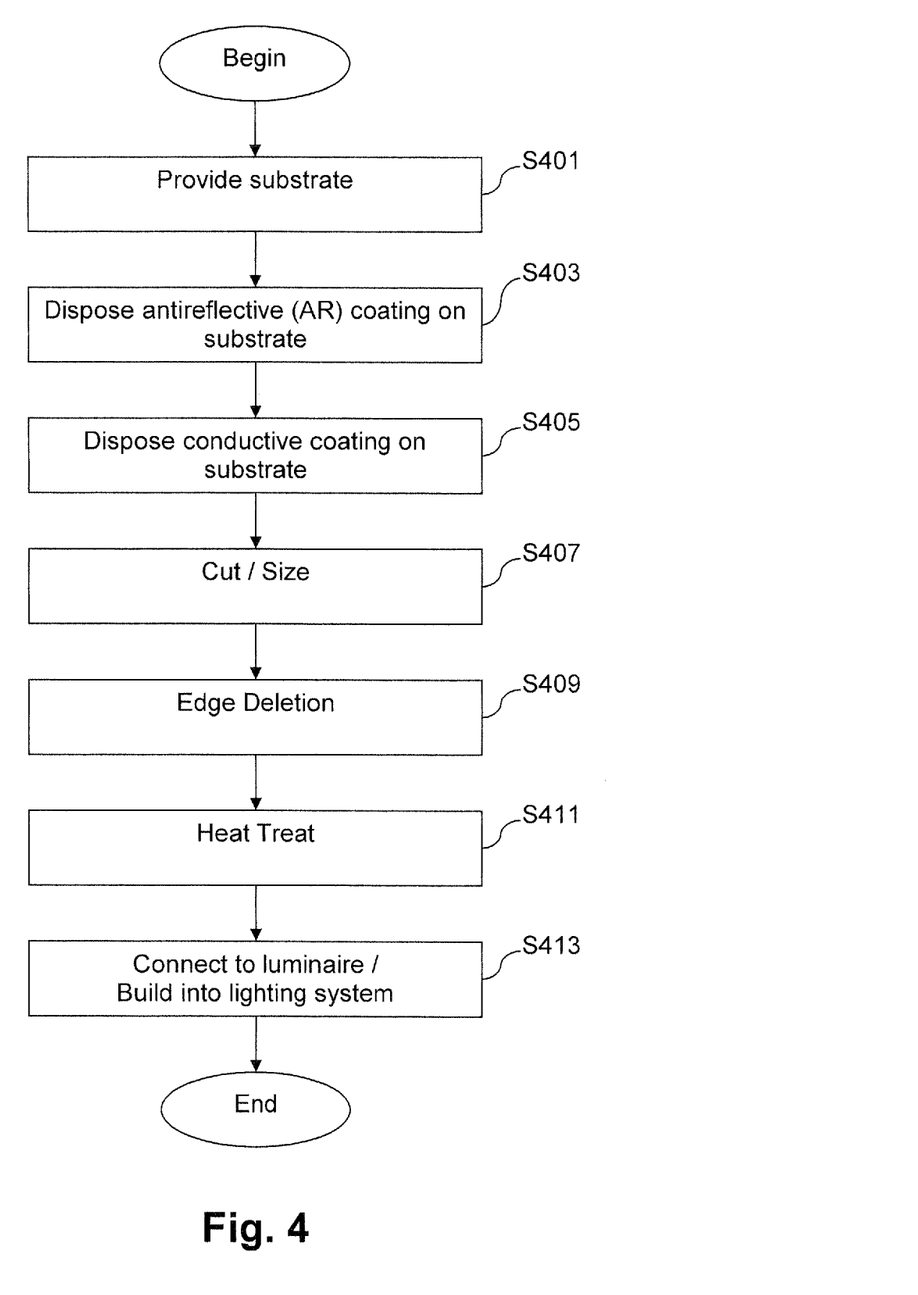
FIG. 4 is a flowchart showing an illustrative process for making the heatable substrate of FIG. 1, in accordance with certain example embodiments.

FIG. 4 is a flowchart showing an illustrative process for making the heatable substrate of FIG. 1, in accordance with certain example embodiments. A substrate is provided in step S401. In steps S403 and S405, the AR coating and conductive coatings are disposed on opposing major surfaces of the substrate, respectively. In some cases, it may be desirable to provide the AR coating on the "tin side" of the glass substrate, e.g., such that residual or higher amounts of tin thereon effectively helps with index matching/overall optics. In step S407, the substrate may be cut or sized, e.g., into multiple units, etc. The coatings may be removed from edge portions via an edge deletion process (such as, for example, grinding or the like). The substrate may be heat treated (e.g., heat strengthened and/or thermally tempered) in step S411. The heat treated article then may be connected to a luminaire and/or built into a lighting system in step S413.

Part of the "installation" or final or near-final assembly process may include, for example, disposing a gasket or other mounting features on the substrate. Edge deletion proximate to contact areas for the gasket or other mounting features may be advantageous, in that the heat generated sometimes may melt or otherwise damage the gasket or other mounting features.

It will be appreciated that the example steps shown in and described in connection with FIG. 4 may be performed in different orders in different example embodiments. For instance, steps S403 and S405 may be reversed, edge deletion may take place after tempering, etc. It also will be appreciated that some steps may be completely removed and that others may be added in some instances. For example, edge deletion is not always required, a conductive coating need not necessarily be formed if a conductive laminate is provided, etc. In still other cases, these steps may be performed by one or more parties. For instance, a stock sheet may be coated by a first manufacturer, e.g., that performs steps S403 and S405, and it may be cut or sized and/or tempered by a separate party. Still another party, perhaps a fabricator, may connect a heat treated substrate to a luminaire or other lighting system. Thus, the process may include various shipment steps that are not expressly shown therein but instead should be understood from this description.

In certain example embodiments, the AR and the conductive coatings may be sputter deposited and heat treatable. However, in certain other example embodiments, this need not necessarily be the case. For instance, the conductive coating may be a sputtered heat treatable coating, whereas the AR coating may be a sputtered (and non-heat treatable coating), a wet-applied or other coating, etc. In other words, any suitable coating technique and/or layer stack may be used for the AR and conductive coatings.

Figure 5:
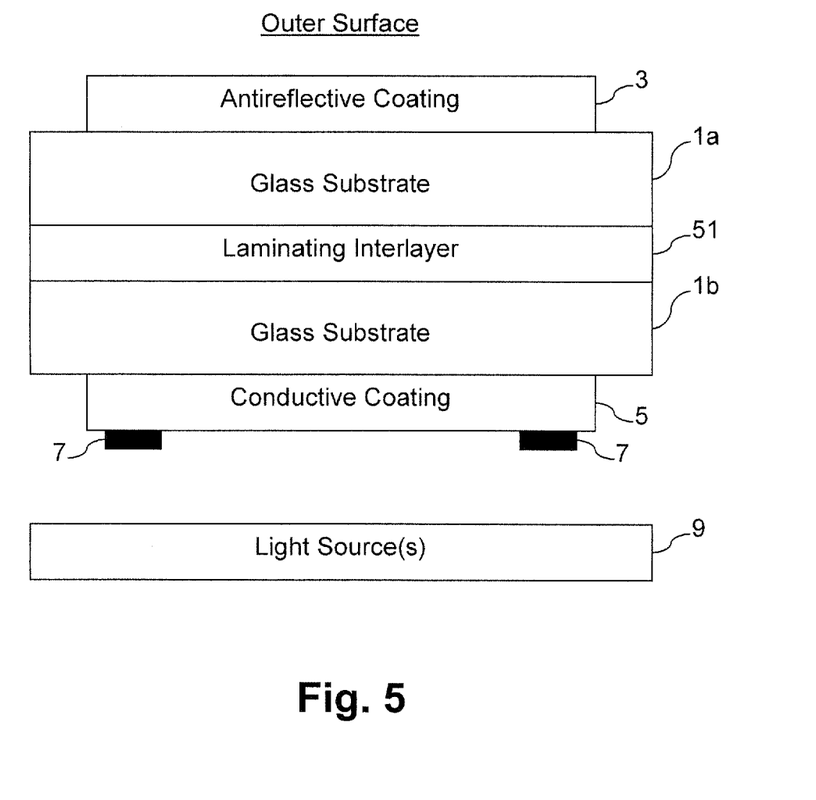
FIG. 5 is a cross-sectional view of an example heatable arrangement in accordance with certain example embodiments.

FIG. 5 is a cross-sectional view of an example heatable arrangement in accordance with certain example embodiments. FIG. 5 is similar to the FIG. 1 design. However, first and second substrates 1a and 1b are laminated to one another via a laminating interlayer 51 (e.g., of or including EVA, PVB, and/or the like). The first substrate 1a may support the antireflective coating 3, whereas the second substrate 1b may support the conductive coating 5. The example arrangement shown in FIG. 5 may be desirable in some instances, e.g., if a single tempered glass substrate is insufficiently strong for the desired application, and/or yet higher impact resistance is desired. The above-described modifications as to the substrates, the coatings, positions with respect to the light source(s), etc., also may be applied to the FIG. 5 example in any suitable combination or sub-combination.

Figure 6:
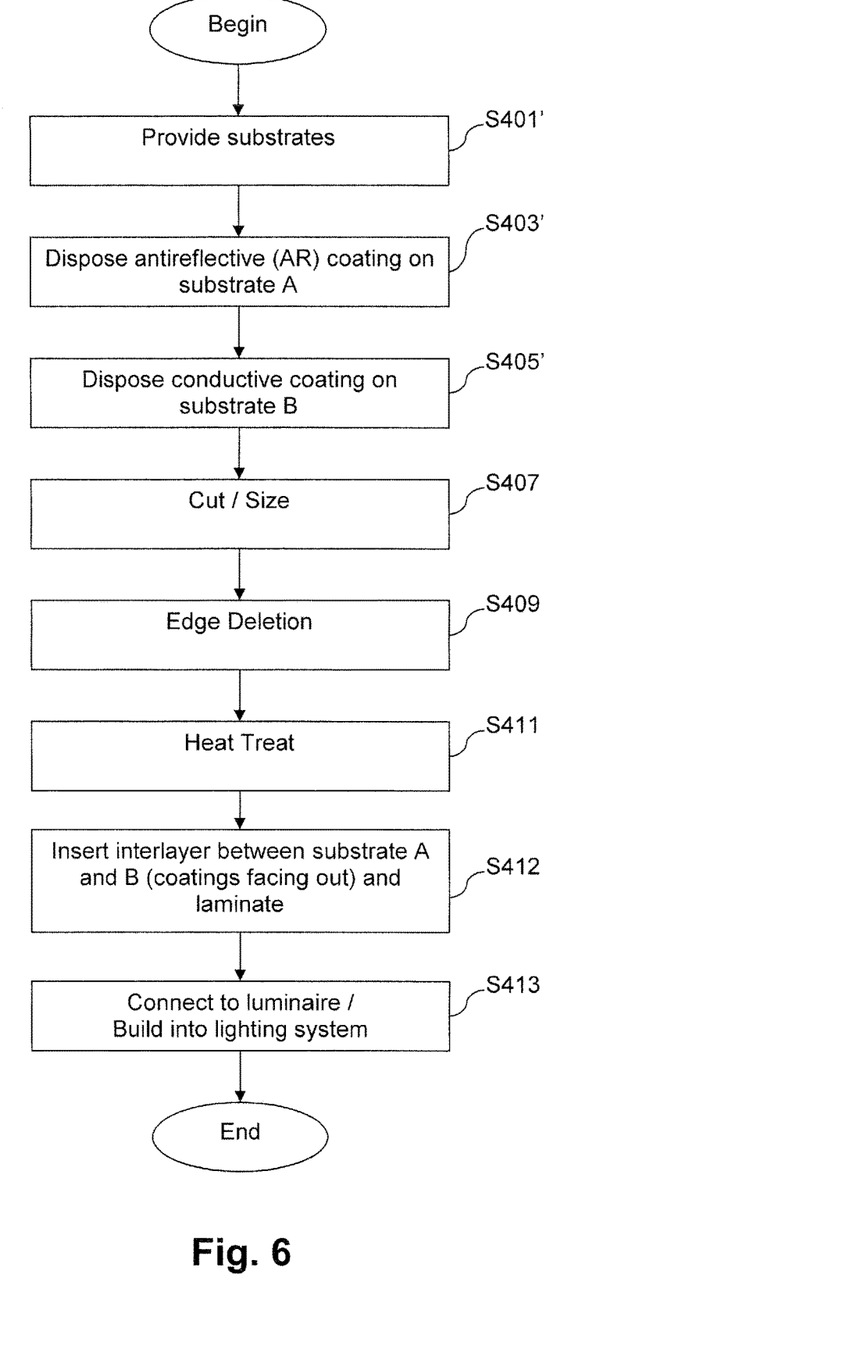
FIG. 6 is a flowchart showing an illustrative process for making the heatable arrangement of FIG. 5, in accordance with certain example embodiments.

FIG. 6 is a flowchart showing an illustrative process for making the heatable arrangement of FIG. 5, in accordance with certain example embodiments. FIG. 6 is similar to FIG. 4, except that first and second substrates are provided in step S401'. The AR coating is disposed on the first substrate in step S403,' and the conductive coating is disposed on the second substrate in step S405'. Much of the process is the same, except that in step S412, an interlayer is inserted between the first and second substrates (e.g., with the coatings facing outwardly), and the substrates are laminated together.

As indicated above, the coated articles described herein may or may not be heat-treated (e.g., tempered) in different example embodiments. Such tempering and/or heat treatment typically requires use of temperature(s) of at least about 580 degrees C., more preferably of at least about 600 degrees C. and still more preferably of at least 620 degrees C. The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments.

As used herein, the terms "on," "supported by," and the like should not be interpreted to mean that two elements are directly adjacent to one another unless explicitly stated. For instance, a first layer may be said to be "on" or "supported by" a second layer, even if there are one or more layers there between.

The terms "peripheral" and "edge" as used herein do not mean the absolute periphery or edge of the substrate, unit, etc., but instead mean at or near (e.g., within about two inches) an edge of the same.

In certain example embodiments, a lens for a lighting system is provided. A glass substrate supports antireflective and transparent coatings on first and second major surfaces thereof, respectively. At least one bus bar is in electrical communication with the conductive coating, with the at least one bus bar being configured to convey voltage to the conductive coating from an external power source to, in turn, cause the conductive coating to heat up. The antireflective and transparent coatings are sputtered coatings. The substrate is heat treated together with the antireflective and transparent coatings thereon.

In addition to the features of the previous paragraph, in certain example embodiments, the antireflective coating may comprise, in order moving away from the substrate: a layer comprising silicon oxynitride; a layer comprising titanium oxide; and a layer comprising silicon oxide.

In addition to the features of either of the two previous paragraphs, in certain example embodiments, the antireflective coating may provide a visible transmission increase of 4% points, compared to a situation where no antireflective coating is provided.

In addition to the features of any one of the previously three paragraphs, in certain example embodiments, post heat treatment, the lens may have a visible transmission of at least 87%.

In addition to the features of any one of the previously four paragraphs, in certain example embodiments, the conductive coating may comprise, in order moving away from the substrate, a layer comprising a transparent conductive oxide (TCO), and a silicon-inclusive overcoat.

In addition to the features of any one of the previously five paragraphs, in certain example embodiments, the antireflective coating may comprise, in order moving away from the substrate, high and low refractive index layers.

In addition to the features of any one of the previously six paragraphs, in certain example embodiments, the conductive coating may comprise a layer comprising a transparent conductive oxide (TCO) sandwiched between first and second layers comprising silicon oxynitride.

In addition to the features of the previous paragraph, in certain example embodiments, the TCO may be indium tin oxide.

In addition to the features of either of the two previous paragraphs, in certain example embodiments, the layer comprising the TCO may have an index of refraction of 1.7-2.1 at 550 nm.

In addition to the features of any one of the previously three paragraphs, in certain example embodiments, the layer comprising the TCO may have a sheet resistance of 10-30 ohms/square and a physical thickness of 100-170 nm.

In addition to the features of any one of the previously four paragraphs, in certain example embodiments, the first and second layers comprising silicon oxynitride each may have refractive indexes of 1.45-2.10 at 550 nm, and an extinction coefficient k of <0.01 at 550 nm.

In addition to the features of any one of the previously five paragraphs, in certain example embodiments, the physical thicknesses of the first and second layers comprising silicon oxynitride may be 55-125 nm.

In addition to the features of any one of the previously six paragraphs, in certain example embodiments, the first and second layers comprising silicon oxynitride each may have refractive indexes of 1.7+/−0.2 at 550 nm, and the layer comprising the TCO may have a refractive index of 1.9+/−0.1 at 550 nm.

In addition to the features of any one of the previously thirteen paragraphs, in certain example embodiments, the heat treatment may be thermal tempering.

In certain example embodiments, a lighting system is provided. One or more solid state lights are included. The lens of any one of the previous fourteen paragraphs may be interposed between the one or more solid state lights and a viewer of the lighting system. A power source is operable to drive the conductive coating of the lens at a power density of 1-6 W/in$^2$.

In addition to the features of the previous paragraph, in certain example embodiments, the one or more solid state lights may comprise an array of organic and/or inorganic light emitting diodes.

In addition to the features of either of the two previous paragraphs, in certain example embodiments, the lens may be spaced apart from the one or more solid state lights.

In certain example embodiments, a lighting system is provided. One or more solid state lights are included. A lens is spaced apart from the one or more solid state lights, with the lens comprising: a first glass substrate supporting a sputter-deposited antireflective coating on a major surface thereof; and a second glass substrate supporting a sputter-deposited conductive coating on a major surface thereof, the first and second substrates being laminated to one another such that coated surfaces thereof face away from one another. The first substrate with the antireflective coating thereon and/or the second with the conductive coating thereon is/are heat treated.

In certain example embodiments, a method of making a heatable lens for a lighting system is provided. A multilayer antireflective coating is sputtering deposited on a first major surface of a glass substrate. A multilayer conductive coating is sputtering deposited on a second major surface of the glass substrate, with the first and second major surfaces being opposite one another. The glass substrate with the multilayer antireflective and conductive coatings thereon is heat treated. At least one bus bar is disposed on the glass substrate such that the at least one bus bar is in electrical communication with the conductive coating so as to heat the substrate when voltage is provided from an external power source.

In addition to the features of the previous paragraph, in certain example embodiments, the antireflective coating may comprise, in order moving away from the substrate: a layer comprising silicon oxynitride; a layer comprising titanium oxide; and a layer comprising silicon oxide.

In addition to the features of the previous paragraph, in certain example embodiments, the conductive coating may comprise a layer comprising a transparent conductive oxide (TCO) sandwiched between first and second layers comprising silicon oxynitride.

In addition to the features of the previous paragraph, in certain example embodiments, the layer comprising the TCO may have a sheet resistance of 10-30 ohms/square and a physical thickness of 100-170 nm.

In addition to the features of either of the two previous paragraphs, in certain example embodiments, the physical thicknesses of the first and second layers comprising silicon oxynitride may be 55-125 nm.

In addition to the features of any one of the previously three paragraphs, in certain example embodiments, the first and second layers comprising silicon oxynitride each may have refractive indexes of 1.7+/−0.2 at 550 nm and an extinction coefficient k of <0.01 at 550 nm, and the layer comprising the TCO may have a refractive index of 1.9+/−0.1 at 550 nm.

In addition to the features of any one of the previously four paragraphs, in certain example embodiments, the heat treatment is thermal tempering.

In certain example embodiments, a method of making a lighting system is provided. A lens is made in accordance with the method of any of the previous seven paragraphs, for example. A solid state light source is provided. The lens is provided in spaced apart relation to the light source. The at least one bus bar of the lens is connected to an external power source.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A lens for a lighting system, comprising:
a glass substrate supporting an antireflective coating and a transparent conductive coating on first and second major surfaces thereof, respectively; and
at least one bus bar in electrical communication with the transparent conductive coating, the at least one bus bar being configured to convey voltage to the transparent conductive coating to cause the transparent conductive coating to heat,
wherein the substrate is to be heat treated together with the antireflective and transparent conductive coatings thereon; and
wherein the transparent conductive coating comprises a layer comprising a transparent conductive oxide (TCO) sandwiched between first and second layers comprising silicon oxynitride.

2. The lens of claim 1, wherein the antireflective coating provides a visible transmission increase of 4% points, compared to a situation where no antireflective coating is provided.

3. The lens of claim 1, wherein post heat treatment, the lens has a visible transmission of at least 87%.

4. The lens of claim 1, wherein the TCO comprises indium tin oxide.

5. A lighting system, comprising:
a lens comprising: a glass substrate supporting an antireflective coating and a transparent conductive coating on first and second major surfaces thereof, respectively; and at least one bus bar in electrical communication with the transparent conductive coating, the at least one bus bar being configured to convey voltage to the transparent conductive coating from an external power source to, in turn, cause the transparent conductive coating to heat;
wherein the lens is interposed between one or more solid state lights and a viewer of the lighting system.

6. The lighting system of claim 5, wherein the one or more solid state lights comprise an array of organic and/or inorganic light emitting diodes.

7. The lighting system of claim 5, wherein the lens is spaced apart from the one or more solid state lights.

8. A lens for a lighting system, comprising:
a glass substrate supporting an antireflective coating and a transparent conductive coating on first and second major surfaces thereof, respectively; and
at least one bus bar in electrical communication with the transparent conductive coating, the at least one bus bar being configured to convey voltage to the transparent conductive coating to cause the transparent conductive coating to heat,
wherein the substrate is configured to be heat treated together with the antireflective and transparent conductive coatings thereon; and
wherein the transparent conductive coating comprises a layer comprising a transparent conductive oxide (TCO) layer comprising ITO sandwiched between first and second dielectric layers comprising silicon and nitrogen, wherein the TCO layer comprising ITO has a thickness of from 100-170 nm and a sheet resistance from 10-30 ohms/square.

9. The lens of claim 8, wherein the first and second dielectric layers each have refractive indexes of 1.7+/−0.2 at 550 nm and an extinction coefficient k of <0.01 at 550 nm, and wherein the layer comprising the TCO has a refractive index of 1.9+/−0.1 at 550 nm.

10. The lens of claim 8, wherein the antireflective coating provides a visible transmission increase of 4% points, compared to a situation where no antireflective coating is provided.

11. The lens of claim 8, wherein post heat treatment, the lens has a visible transmission of at least 87%.

12. A lighting system including the lens of claim 8, wherein the lens is interposed between one or more solid state lights and a viewer of the lighting system.

13. The lighting system of claim 12, wherein the lens is spaced apart from the one or more solid state lights.

* * * * *